United States Patent [19]

Tsukamoto et al.

[11] Patent Number: 4,621,710
[45] Date of Patent: Nov. 11, 1986

[54] BEARING LUBRICATION SYSTEM FOR EXTENSION HOUSING OF VEHICULAR TRANSMISSION

[75] Inventors: Kazumasa Tsukamoto; Takuji Taniguchi, both of Anjo; Seitoku Kubo; Yutaka Taga, both of Toyota, all of Japan

[73] Assignees: Aisin-Warner Limited, Anjo; Toyota Motor Corporation, Toyota, both of Japan

[21] Appl. No.: 683,616

[22] Filed: Dec. 19, 1984

[30] Foreign Application Priority Data

Dec. 27, 1983 [JP] Japan ................................ 58-247443
Dec. 27, 1983 [JP] Japan ................................ 58-247444
Dec. 27, 1983 [JP] Japan ................................ 58-247445

[51] Int. Cl.$^4$ .......................................... F01M 11/06
[52] U.S. Cl. ...................................... 184/6.27; 184/8; 184/6.12
[58] Field of Search ................... 184/6.12, 6.27, 8; 74/467, 468

[56] References Cited

U.S. PATENT DOCUMENTS

| 314,934 | 3/1885 | Hartnett | 184/8 |
|---|---|---|---|
| 4,090,748 | 5/1978 | Sugimoto et al. | 74/467 X |
| 4,329,887 | 5/1982 | Kawamoto | 74/467 |
| 4,348,914 | 9/1982 | Kawamoto | 184/6.12 X |
| 4,400,989 | 8/1983 | Ikemoto et al. | 184/6.12 X |
| 4,448,089 | 5/1984 | Ikemoto et al. | 184/6.12 X |

FOREIGN PATENT DOCUMENTS 84260 5/1983 Japan ...................................... 74/467

*Primary Examiner*—Leonard E. Smith
*Attorney, Agent, or Firm*—Pahl, Lorusso & Loud

[57] ABSTRACT

A bearing lubrication system for an extension housing of automatic transmission, including an extension housing connected to a transmission case, a valve casing of a hydraulic control system fastened to the transmission case, a transmission output shaft supported in the extension housing, and a sleeve yoke splined to the output shaft and fitted in a bearing portion of the extension housing through a bearing, characterized in that the lubrication system is provided with a forced lubrication means comprising: a bearing lubricant tapping passage branched off from a lubricant oil passage or line pressure conduit in the transmission case or in the valve casing; a bearing lubricant supply passage communicating the bearing lubricant tapping passage with the bearing portion of the extension housing; and a flow control throttle provided in the bearing lubricant tapping passage or in the bearing lubricant supply passage.

6 Claims, 3 Drawing Figures

BEARING LUBRICATION SYSTEM FOR EXTENSION HOUSING OF VEHICULAR TRANSMISSION

BACKGROUND OF THE INVENTION i. Field of the Invention

This invention relates to a bearing lubrication system for extension housings of automatic transmissions for motor vehicles.

ii. Description of the Prior Art

An extension housing which constitutes part of a vehicular transmission case on the side of the transmission output shaft has a bearing portion for supporting the output shaft along with necessary lubricative means including oil seal. However, since it is located at the rear end of a transmission, smooth rotation of the output shaft is often hindered by restricted and insufficient supply of lubricant oil to those parts which need lubrication, resulting in undesirable output losses. In addition, the insufficient supply of lubricant oil gives rise to problems such as deterioration of sliding parts due to increased frictional heat generation and degradations of other parts induced by deterioration of sliding parts.

For supplying lubricant oil to a bearing portion of an extension housing which supports an output shaft, it has been the conventional practice to distribute lubricant oil to inner wall surfaces of the extension housing through oil passages formed in the output shaft with the aid of centrifugal force, or to distribute the oil to the bearing portions along ribs or grooves formed on inner wall surfaces of the extension housing, mainly utilizing the drain oil of a governor valve as a lubricant oil. These methods of lubrication have the following drawbacks.

(a) The drain oil which is supplied through the oil passages in the output shaft is applied to the inner wall surfaces of the extension housing by the centrifugal force, so that it fails to reach the inner wall surfaces of the extension housing in low speed operations.

(b) The oil which is supplied to the bearing portions along grooves or ribs formed on the inner wall surfaces of the extension housing hardly distributed when the vehicle is in a forwardly inclined state or on a downhill.

(c) The drain oil from the governor valve is not supplied when the shift lever is in neutral, reverse and parking positions.

(d) The drain oil of the governor oil is leaked in a greater amount at high temperatures, while the supply of the lubricant along ribs becomes difficult at low temperatures due to increased viscosity of the oil.

SUMMARY OF THE INVENTION

It is an object of the present invention to provide a bearing lubrication system for an extension housing of vehicular automatic transmission, which is capable of supplying a lubricant to a bearing portion of an extension housing of an automatic transmission stably in a suitable amount without influenced by the speed and posture of the vehicle as well as temperature.

It is another object of the invention to provide a bearing lubrication system of the sort mentioned above, employing a forced lubricating means capable of supplying a lubricant constantly to the bearing portion of the extension housing.

According to a fundamental aspect of the invention, there is provided a bearing lubrication system for an extension housing of vehicular automatic transmission, including a transmission case, a speed-change mechanism housed in the transmission case, i.e., a gear transmission mechanism, a V-belt transmission mechanism or a planetary gear transmission mechanism, a hydraulic control system having a valve casing fastened to the transmission case, an extension housing connected to the transmission case, an output shaft mounted in the extension housing, and a sleeve yoke splined to the output shaft and fitted in a bearing portion of the extension housing through bushing or bearing, characterized in that the bearing lubrication system comprises: a bearing lubricant tapping passage communicating with a lubricant oil passage or line pressure passage in the transmission case or valve casing; a bearing lubricant supply passage communicating the bearing lubricant tapping passage with the bearing portion; and a flow control throttle provided in the bearing lubricant tapping passage or in the bearing lubricant supply passage.

In a preferred form of the invention, the bearing lubricant supply passage is constituted by a pipe of a simple construction which is easy to assemble to communicate the bearing lubricant tapping passage with the bearing portion of the extension housing.

The above-described bearing lubrication means according to the invention has the following advantageous effects.

(1) The lubricant oil can be distributed to the bearing portion of the extension housing stably in an appropriate amount without influenced by the shift position.

(2) The lubricant oil can be distributed to the bearing portion of the extension housing stably in an appropriate amount irrespective of the rotational speed of the output shaft.

(3) The lubricant oil can be distributed to the bearing portion of the extension housing stably in an appropriate amount regardless of the posture of the vehicle.

(4) The lubricant oil can be distributed to the bearing portion of the extension housing stably in an appropriate amount free of influences of coefficient of viscosity of the lubricant oil.

The above and other objects, features and advantages of the invention will become apparent from the following description and appended claims, taken in conjunction with the accompanying drawings which show by way of example some preferred embodiments of the invention.

DESCRIPTION OF PREFERRED EMBODIMENTS

Figure 1:
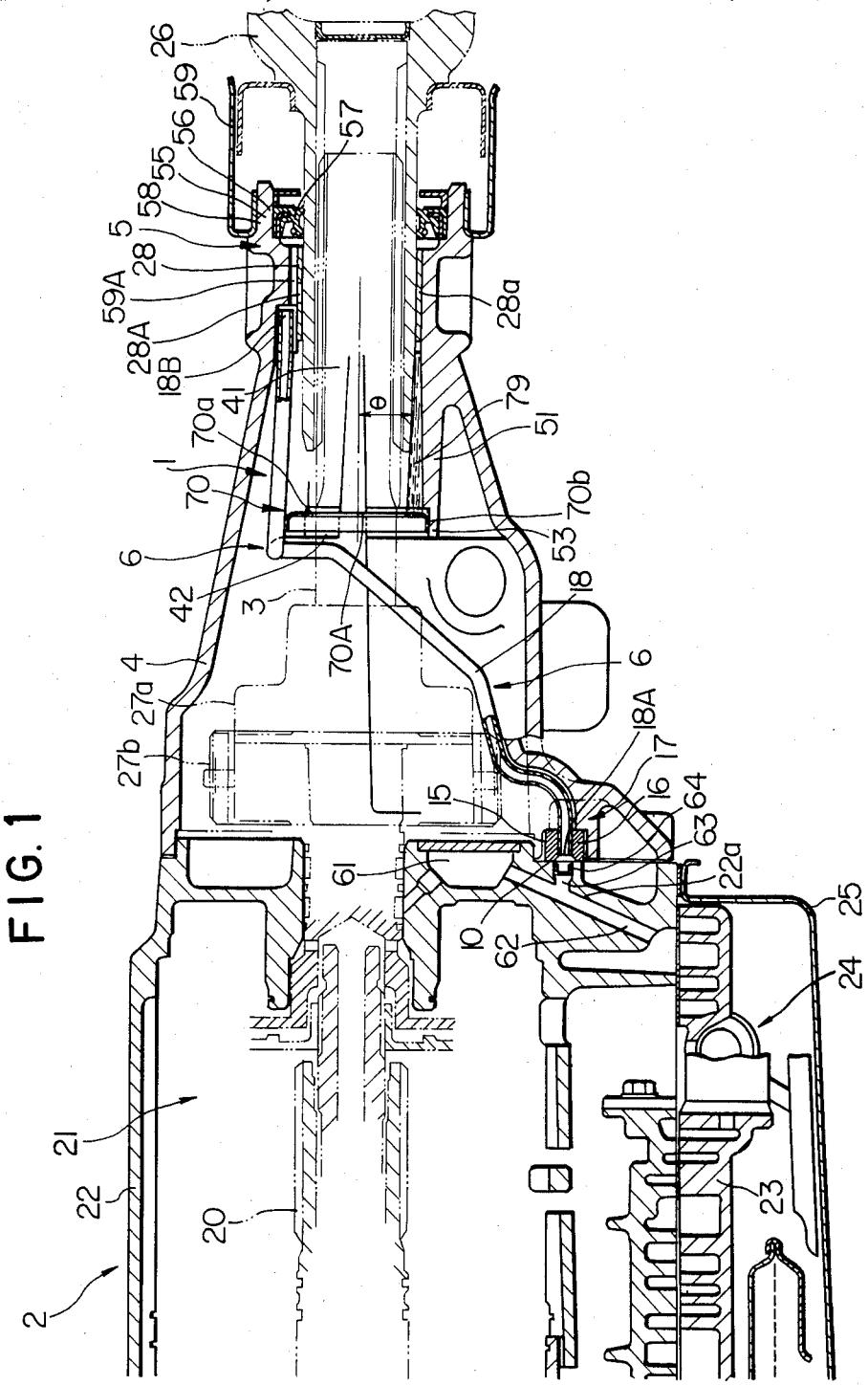
FIG. 1 is a sectioned front view of a bearing lubrication system for an extension housing of vehicular transmission, embodying the present invention.
Figure 2:
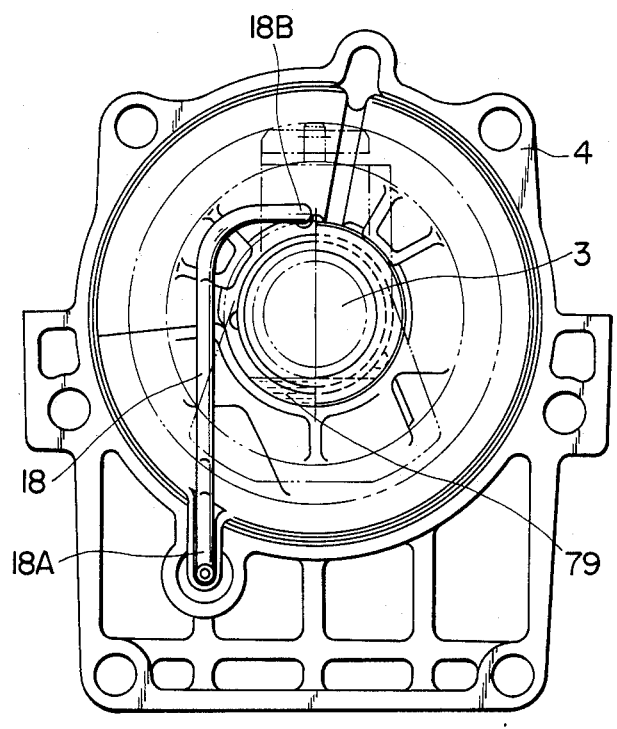
FIG. 2 is a side view of an extension housing incorporating the bearing lubrication system of the invention.
Figure 3:
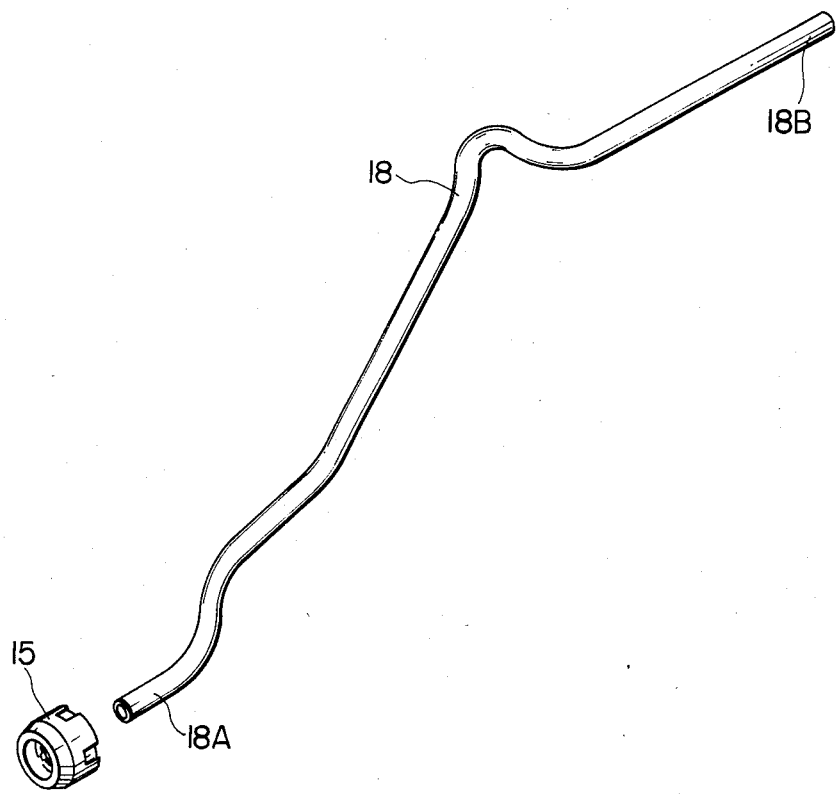
FIG. 3 is a schematic perspective view of a pipe constituting the bearing lubricant supply passage of the lubrication system.

Illustrated in FIGS. 1 to 3 is an extension housing bearing lubrication system according to the invention, which is incorporated into a typical vehicular automatic transmission 2 with four forward and one reverse speed ranges including overdrive (OD).

This vehicular automatic transmission 2 includes: a torque converter housing (not shown) accommodating a torque converter, an overdrive mechanism and an input shaft of the automatic transmission; a transmission case 22 accommodating an intermediate shaft 20 connected to the input shaft, a speed-change mechanism 21 including a planetary gear system, clutches and brakes for shifts to and from three forward and one reverse positions; a hydraulic control system 24 fastened to the lower side of the transmission case 22 and including valves of various functions, shift valves for switching paths of oil pressure, a throttle valve for producing shift signals, an oil pump for generating oil pressure, and a valve casing 23; an oil pan 25 accommodating the hydraulic control system 24; an extension housing 4 fastened to the rear side of the transmission case 22 by bolts which are not shown, and accommodating an output shaft 3 connected to the intermediate shaft 20, an electronic vehicle speed sensor 27a mounted on the output shaft 3 and turned on and off by a lead switch which is not shown, or a governor valve 27b mounted on the output shaft 3 to produce governor pressure commensurate with the rotational speed of the output shaft, that is to say, commensurate with the vehicle speed; a sleeve yoke 26 splined to the output shaft 3 and supported in a bearing portion 5 of the extension housing 4 through a bearing (a radial bearing) 28; and a forced lubrication means 6 for supplying lubricant oil to the bearing portion 5 of the extension housing 4 stably in an appropriate amount.

The bearing portion 5 of the extension housing 4 includes an oil seal 57 which is mounted on an inner peripheral portion 56 of an extension 55 projecting rightward in the drawing from the outer end of the bearing portion, thereby to prevent intrusion of foreign matter onto the output shaft 3 and leakage of the lubricant oil. A dust cover 59 is fitted around the outer peripheral portion 58 of the extension 55 to keep foreign matter off the oil seal 57. In the lower the bottom of bearing portion 5 is provided with a gutter-like extension 51 projecting toward the transmission case 22 (leftward in the drawing) and forming an oil pool as will be described hereinlater. Further, an oil hole 59A is formed in an upper portion of the bearing portion 5, in communication with an oil hole 28A which is formed in the radial bearing 28.

The forced bearing lubricating means 6 of the invention further includes an oil pool weir 70 which is constituted by the afore-mentioned gutter-like extension 51 and an annular plate 70A which is fixed on the inner periphery of the gutter-like extension 51 in coaxial relation with the output shaft 3. The annular plate 70A has its upper portion 70a supported by a holder portion 42 projected from the inner wall 41 of the housing 4, and its lower portion 70b supported on the fore end 53 of the gutter-like extension 51, forming an oil pool weir 70 to maintain the level of an oil pool 79, which is formed on the gutter-like extension 51 between the radial bearing 28 and oil pool weir 70, above the lowermost side 28a of the radial bearing 28. The lubricant oil is supplied to the bearing portion of the extension housing by a lubricant oil supply means which includes: a line pressure conduit 62 which supplies line pressure from the valve casing 23 to a hydraulic servo (not shown) of a shift mechanism 21 through an oil chamber 61; a bearing lubricant tapping passage 63 formed by drilling or casting in a wall 22a of the transmission case 22 and branched off the line pressure conduit 62 at a position between the valve casing 23 and oil chamber 61; a flow control throttle (an orifice in the particular example shown) 64 mounted in the bearing lubricant tapping passage 63 to control the flow rate of lubricant oil by its constricting action; a cylinder tube or pipe 18 forming a lubricant supply passage connected at its one end 18A to the bearing lubricant tapping passage 63 preferably through a connecting member 17 having as a seal means a cylindrical packing 16 which is fitted in a packing seat 15 formed one of joint surfaces 10 of the extension housing 4 and the transmission case 22, thereby preventing leakage of the lubricant oil and at the other end 18B to the oil holes 59A and 28A in the bearing portion 5 of the extension housing 4 and the radial bearing 28, and the pipe 18 being bent in such a manner as to evade the output shaft 3, oil pool weir 70, and electronic vehicle speed sensor 27a or governor valve 27b.

With this arrangement, the operating oil (lubricant oil) in the line pressure conduit 62 is withdrawn into the cylinder tube 18 through the bearing lubricant tapping passage 63 at a suitable rate determined by the orifice 64. The lubricant oil which flows out of the terminal end 18B of the cylinder tube 18 is supplied to the bearing portion 5, more particularly, to the oil hole 59A to lubricate the oil seal 57 and radial bearing 28. After lubrication of the oil seal 57 and radial bearing 28, the lubricant oil is further distributed to lubricate the sleeve yoke 26 and output shaft 3 before supply to the oil pool 79. Since the cylinder tube 18 is located in a position proximal to the outer periphery of the electronic vehicle speed sensor 27a, it is possible to provide an oil bleed hole in the cylinder tube 18 for the purpose of lubricating speed meter gears (not shown). As a consequence, the output shaft 3 is rotated smoothly to reduce losses of output power of the engine which drives the output shaft 3, as well as the fuel consumption of the engine.

Although in the foregoing embodiment, the bearing lubricant tapping passage 63 is constituted by a hole which is formed by drilling or casting in communication with the line pressure conduit 62, it may be formed in the valve casing 23 similarly by drilling or casting.

Further, the cylinder tube 18 which constitutes a bearing lubricant supply passage may be replaced by a hole which is formed in the wall of the extension housing 4 or in the output shaft 3 by drilling or casting. If desired, the orifice 64 which is provided in the bearing lubricant tapping passage 63 may be provided in the cylinder tube 18 or in packing 16.

What is claimed is:

1. A bearing lubrication system for bearing means supported with an extension housing of an automatic transmission, said extension housing connected at one end face flush to an end face of a transmission case, said transmission having a hydraulic control system incuding a valve casing fastened to said transmission case and a transmission output shaft supported in said extension housing, and said extension housing having a sleeve yoke splined to said output shaft and fitted within the bearing means supported by said extension housing, wherein said hydraulic control system includes a first passage formed in said transmission case for supply of hydraulic operating fluid under pressure from said valve means, and wherein said lubrication system is provided with a forced feed lubrication means comprising:

second passage means, branched off from said first passage, for supplying hydraulic operating fluid to said bearing means thereby lubricating said bearing means, second passage means including a first passage portion running through said transmission case and terminating at said end face of said transmission case and a second passage portion running between a first terminus at said one end face and a second terminus discharging said fluid for lubrication of said bearing means;

sealing means for connecting said first and second passage portions at the juncture of said end faces;

throttle means, disposed within said second passage means, for limiting the flow of fluid therethrough; and fluid collecting means for establishing a pool of said fluid in contact with said bearing beneath said output shaft, said fluid collecting means comprising a weir and a trough formed in said extension housing and running between said weir and said bearing means.

2. A bearing lubrication sytem in accordance with claim 1 wherein said weir is an annular plate surrounding said output shaft.

3. A bearing lubrication system in accordance with claim 1 wherein said weir is located between said bearing means and said transmission case.

4. A bearing lubrication system in accordance with claim 1 wherein said bearing comprises a radial sleeve bearing with an oil hole therethrough and wherein said second terminus of said second passage is positioned for discharge of said fluid onto the top of said radial sleeve bearing.

5. A bearing lubrication system in accordance with claim 1 additionally comprising a fluid reservoir for receiving said fluid supplied from said valve means through said first passage.

6. A bearing lubrication system in accordance with claim 1 wherein said sealing means is a cylindrical member fitted within a recess in one of said end faces and surrounding said second passage means.

* * * * *